United States Patent
Lee et al.

(10) Patent No.: US 10,600,550 B2
(45) Date of Patent: Mar. 24, 2020

(54) COIL COMPONENT

(71) Applicant: SAMSUNG ELECTRO-MECHANICS CO., LTD., Suwon-si, Gyeonggi-do (KR)

(72) Inventors: Hwan Soo Lee, Suwon-si (KR); Yoon Hee Cho, Suwon-si (KR); Sung Min Song, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 82 days.

(21) Appl. No.: 15/865,484

(22) Filed: Jan. 9, 2018

(65) Prior Publication Data

US 2019/0057801 A1   Feb. 21, 2019

(30) Foreign Application Priority Data

Aug. 18, 2017   (KR) .................. 10-2017-0104806

(51) Int. Cl.
   *H01F 5/00*   (2006.01)
   *H01F 27/255*   (2006.01)
   (Continued)

(52) U.S. Cl.
   CPC .......... *H01F 27/255* (2013.01); *B22F 1/0003* (2013.01); *B32B 15/012* (2013.01);
   (Continued)

(58) Field of Classification Search
   CPC ................................................. H01F 2017/048
   (Continued)

(56) References Cited

U.S. PATENT DOCUMENTS 5,963,119 A * 10/1999 Takeda ................ H01F 17/0033
                                                                 336/206
6,362,713 B1 * 3/2002 Masuda ................ H01F 17/045
                                                                 336/192
(Continued)

FOREIGN PATENT DOCUMENTS

JP   2001-155950 A   6/2001
JP   2001-308538 A   11/2001
(Continued)

OTHER PUBLICATIONS

WE-PMI Power Multilayer Inductor (Würth Elektronik eiSos GmbH & Co.KG?74479763215 Data Sheet, Mar. 10, 2014, pp. 1-7) (discussed in Sep. 25, 2018 OA issued in corresponding JP Appln. No. 2018-004788).

(Continued)

*Primary Examiner* — Ronald Hinson
(74) *Attorney, Agent, or Firm* — Morgan, Lewis & Bockius LLP

(57) ABSTRACT

A coil component includes a body having a volume of 2.4 mm³ or less and including at least one coil member embedded therein, and first and second external electrodes partially or entirely formed on first and second surfaces of the body opposing each other, respectively, wherein the product of inductance Ls (μH) and S/l (mm) is 0.45 (μH·mm) or more to 0.75 (μH·mm) or less in which S (mm²) is an area of regions of the first and second external electrodes disposed on the first and second surfaces of the body, and l (mm) is a minimum spaced distance between the first and second external electrodes formed on the first and second surfaces of the body.

14 Claims, 6 Drawing Sheets

(51) Int. Cl.

| | |
|---|---|
| *H01F 27/29* | (2006.01) |
| *H01F 17/00* | (2006.01) |
| *H01F 41/02* | (2006.01) |
| *B22F 1/00* | (2006.01) |
| *C22C 45/02* | (2006.01) |
| *C22C 33/02* | (2006.01) |
| *B32B 15/01* | (2006.01) |
| *C22C 38/00* | (2006.01) |
| *H01F 17/04* | (2006.01) |
| *H01F 1/153* | (2006.01) |

(52) U.S. Cl.
CPC .......... *B32B 15/013* (2013.01); *B32B 15/018* (2013.01); *C22C 33/0207* (2013.01); *C22C 33/0257* (2013.01); *C22C 38/00* (2013.01); *C22C 45/02* (2013.01); *H01F 17/0013* (2013.01); *H01F 27/292* (2013.01); *H01F 41/0246* (2013.01); *B22F 2999/00* (2013.01); *H01F 1/15308* (2013.01); *H01F 2017/048* (2013.01)

(58) Field of Classification Search
USPC .......................................................... 336/200
See application file for complete search history.

(56) References Cited

U.S. PATENT DOCUMENTS

| | | | |
|---|---|---|---|
| 6,373,368 | B1 | 4/2002 | Shikama et al. |
| 2012/0062348 | A1* | 3/2012 | Hashimoto ......... H01F 17/0013 336/192 |
| 2014/0175898 | A1* | 6/2014 | Kurs ...................... B60L 53/51 307/104 |
| 2015/0028983 | A1* | 1/2015 | Ryu .................... H01F 1/15308 336/192 |
| 2015/0102891 | A1 | 4/2015 | Yoon et al. |
| 2016/0027574 | A1 | 1/2016 | Aoki et al. |

FOREIGN PATENT DOCUMENTS

| | | |
|---|---|---|
| JP | 2012-64683 A | 3/2012 |
| JP | 2015-26812 A | 2/2015 |
| JP | 2015-142074 A | 8/2015 |
| JP | 2016-31960 A | 3/2016 |
| KR | 10-2015-0105691 A | 9/2015 |
| KR | 10-1642578 B1 | 8/2016 |

OTHER PUBLICATIONS

Office Action dated Sep. 25, 2018 issued in corresponding Japanese Patent Application No. 2018-004788, with English Abstract.

* cited by examiner

COIL COMPONENT

CROSS-REFERENCE TO RELATED APPLICATION(S)

This application claims the benefit of priority to Korean Patent Application No. 10-2017-0104806 filed on Aug. 18, 2017 in the Korean Intellectual Property Office, the disclosure of which is incorporated herein by reference in its entirety.

TECHNICAL FIELD

The present disclosure relates to a coil component.

BACKGROUND

As the range of applications of wireless power transmission technology has expanded, various attempts to improve efficiency of a power amplifier have been conducted, central among them being envelope tracking (ET) technology, using active voltage control.

In an output terminal of an envelope tracker integrated circuit (ET IC) for implementing envelope tracking (ET), generally, a power inductor and a bead, in addition to a multilayer ceramic capacitor, have been used so as to prevent high-frequency noise (50 MHz or more, for example, 80 to 130 MHz) from being transferred to the power amplifier at the time of operation, while serving to supply power to the power amplifier.

Meanwhile, in accordance with the recent trend for the miniaturization of electronic products, there is an attempt to provide a coil component capable of simultaneously performing functions of the power inductor and the bead disposed in the output terminal of the envelope tracker integrated circuit (ET IC). However, in view of the fact that in a small coil component, a self resonant frequency (SRF) is formed in an excessively high frequency region, it has been difficult to implement a coil component as described above without changing a type of magnetic material or a shape of electrodes.

SUMMARY

An aspect of the present disclosure may provide a small coil component capable of performing integrated functions of a power inductor and a bead.

According to an aspect of the present disclosure, a coil component may include a body having a volume of 2.4 mm$^3$ or less and including at least one coil member embedded therein, and first and second external electrodes partially or entirely formed on first and second surfaces of the body opposing each other, respectively, wherein the product of inductance Ls (pH) and S/l (mm) is 0.45 (μH·mm) or more to 0.75 (μH·mm) or less in which S (mm$^2$) is an area of regions of the first and second external electrodes disposed on the first and second surfaces of the body, and l (mm) is a minimum spaced distance between the first and second external electrodes formed on the first and second surfaces of the body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
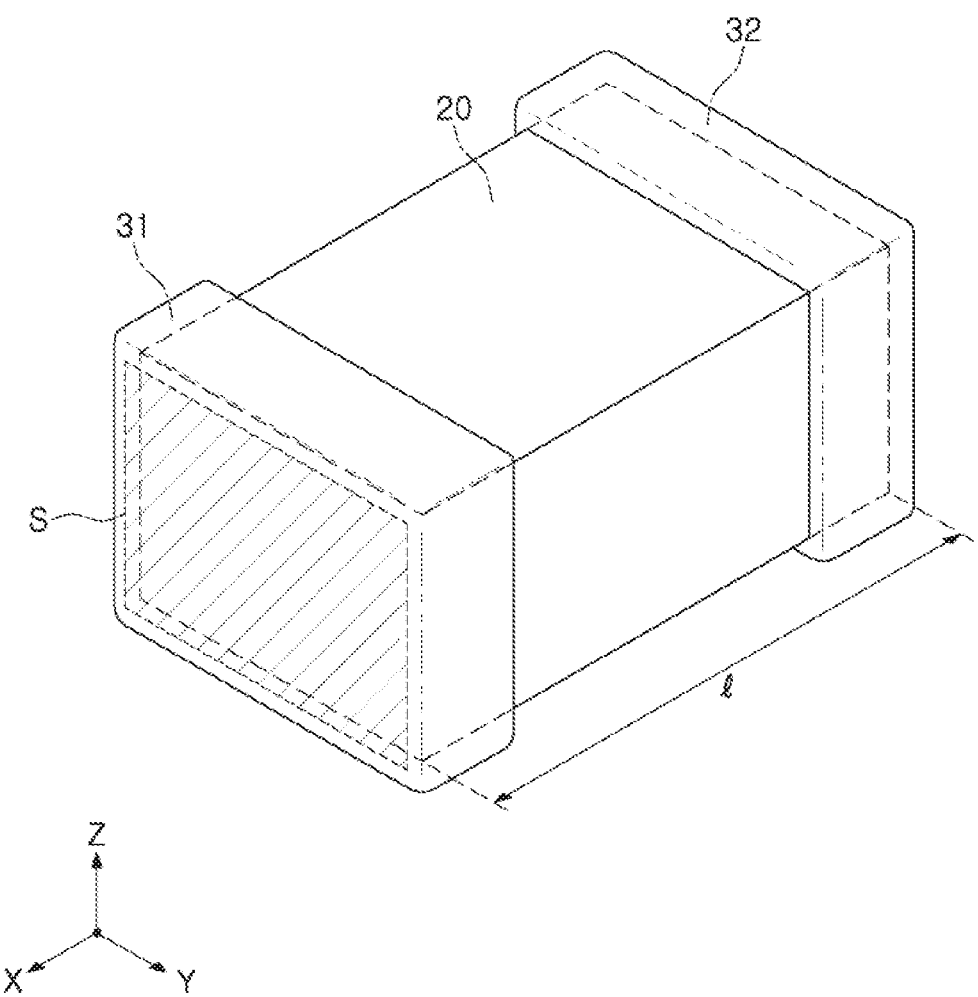
FIG. 1 is a schematic perspective view illustrating a coil component according to an embodiment in the present disclosure.

Hereinafter, embodiments of the present disclosure will now be described in detail with reference to the accompanying drawings.

In the accompanying drawings, shapes, sizes and the like, of the components may be exaggerated or shortened for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated, listed items.

It will be apparent that, although the terms 'first,' 'second,' 'third,' etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" or the like, may be used herein for ease of description to describe one element's relationship relative to another element(s), as shown in the figures. It will be understood that spatially relative terms are intended to encompass different orientations of the device in use or operation, in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations, depending on a particular directional orientation of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape resulting from manufacturing. The following embodiments may also be constituted alone or as a combination of several or all thereof.

The contents of the present disclosure described below may have a variety of configurations, and only a required configuration is proposed herein, but the present disclosure is not limited thereto.

Hereinafter, a coil electronic component according to an embodiment in the present disclosure, particularly, a thin film type inductor will be described by way of example. However, the coil electronic component according to an embodiment in the present disclosure is not limited thereto, but may also be applied to a winding type inductor, a multilayer type inductor, and the like.

Figure 2:
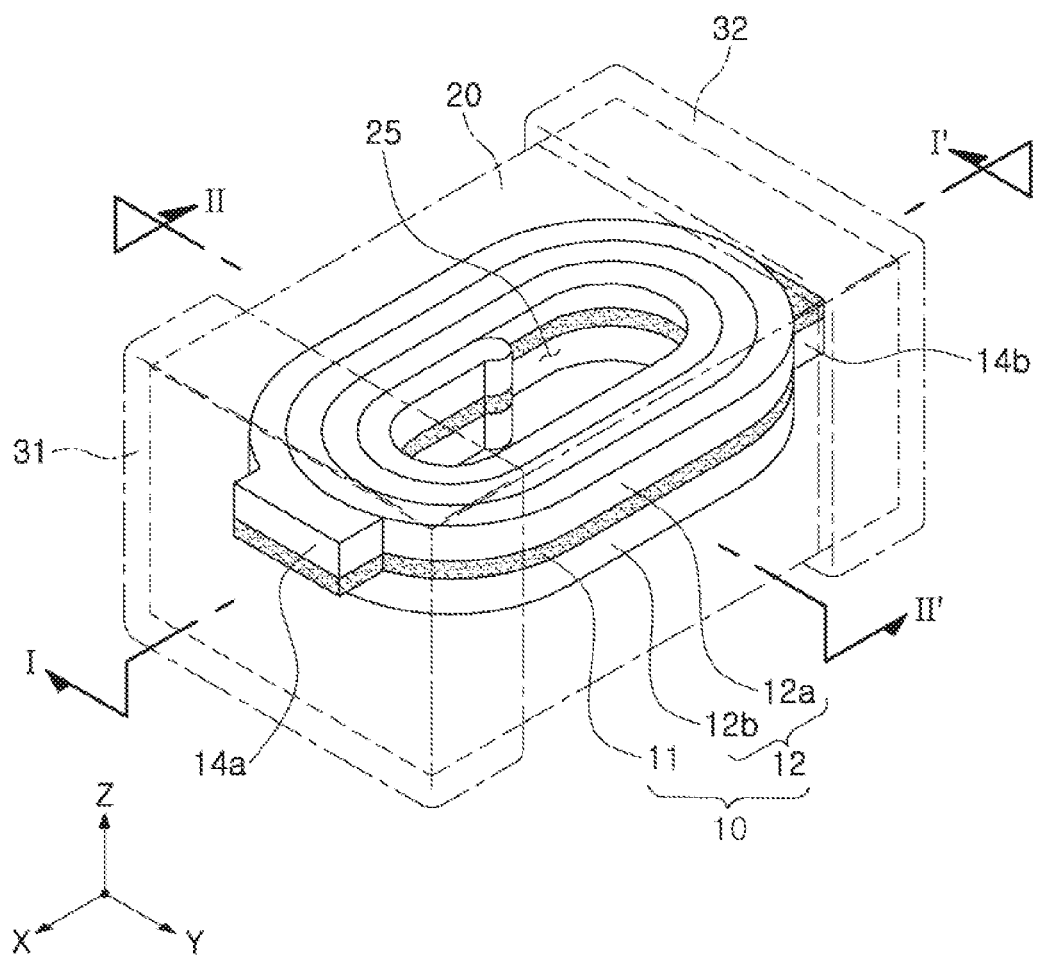
FIG. 2 is a schematic perspective view illustrating the coil component according to an embodiment in the present disclosure so that a coil member of the coil component is viewed.
Figure 3:
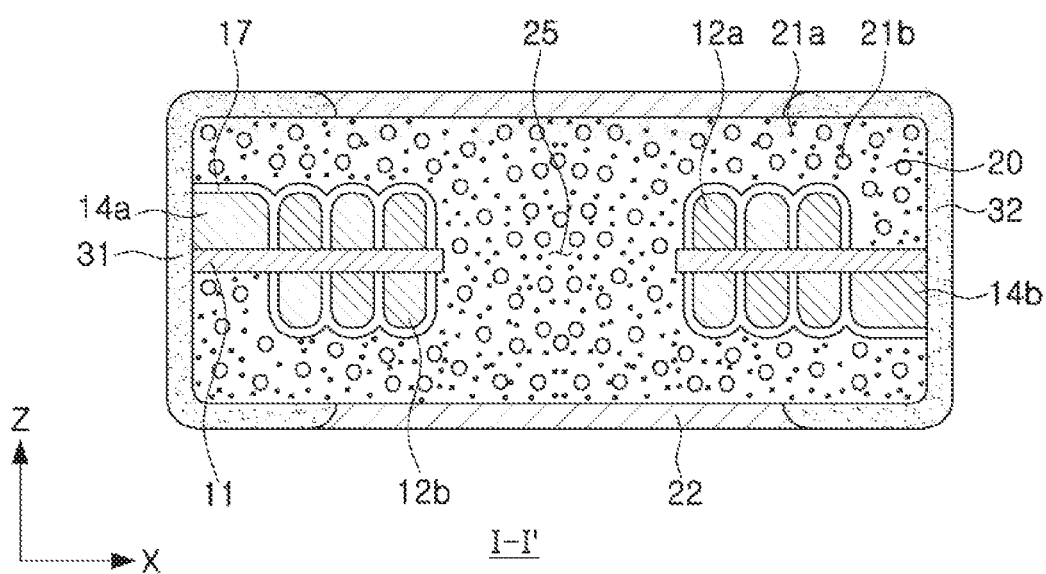
FIG. 3 is a schematic cross-sectional view taken along line I-I' of FIG. 1.
Figure 4:
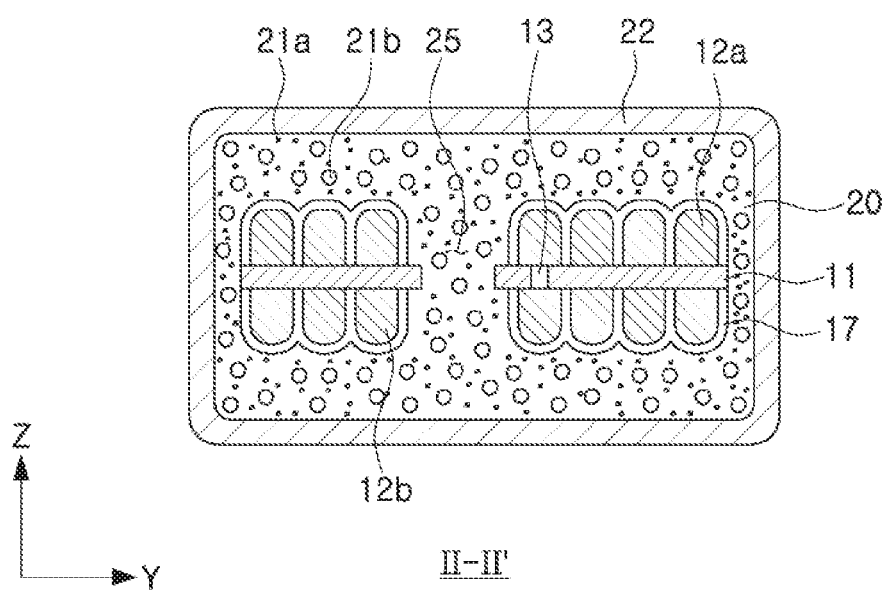
FIG. 4 is a schematic cross-sectional view taken along line II-II' of FIG. 1.

FIG. 1 is a schematic perspective view illustrating a coil component according to an embodiment in the present disclosure. FIG. 2 is a schematic perspective view illustrating the coil component according to an embodiment in the present disclosure so that a coil member of the coil component is viewed. FIG. 3 is a schematic cross-sectional view taken along line I-I' of FIG. 1, and FIG. 4 is a schematic cross-sectional view taken along line II-II' of FIG. 1.

In the following description described with reference to FIG. 1, a 'length' direction refers to an 'X' direction of FIG. 1, a 'width' direction refers to a 'Y' direction of FIG. 1, and a 'thickness' direction refers to a 'Z' direction of FIG. 1.

Referring to FIGS. 1 and 2, a coil component according to an embodiment in the present disclosure includes a coil member 10 including a coil conductor 12, a body 20 formed around the coil member to form an exterior of the coil component, and first and second external electrodes 31 and 32 disposed on an outer portion of the body.

The coil member 10 includes a coil substrate 11 and first and second coil conductors 12a and 12b formed on a first surface and a second surface of the coil substrate opposing each other.

The first and second coil conductors 12a and 12b may be planar coils having a spiral shape, and are electrically connected to each other through an internal via 13 penetrating through the coil substrate 11.

The first and second coil conductors 12a and 12b may be formed on the coil substrate 11 by an electroplating method. However, a method of forming the first and second coil conductors 12a and 12b is not limited thereto, but any method known in the art may be used as long as a similar effect is exhibited.

The first and second coil conductors 12a and 12b may be formed of a metal having excellent electric conductivity, for example, silver (Ag), palladium (Pd), aluminum (Al), nickel (Ni), titanium (Ti), gold (Au), copper (Cu), platinum (Pt), an alloy thereof, etc. However, the material of forming first and second coil conductors 12a and 12b is not limited thereto.

One end portion of the first coil conductor 12a is extended to form a first lead 14a, and the first lead 14a is exposed to a first end surface of the body 20 in the length (L) direction. Further, one end portion of the second coil conductor 12b is extended to form a second lead 14b, and the second lead 14b is exposed to a second end surface of the body 20 in the length (L) direction. However, the first and second lead portions 14a and 14b are not limited thereto, but may be exposed to at least one surface of the body 20.

The first and second coil conductors 12a and 12b are coated with a coil insulating layer 17 to thereby not directly contact a magnetic material forming the body 20. The coil insulating layer 17 may contain one or more selected from the group consisting of epoxy, polyimide, and a liquid crystal polymer (LCP), but is not limited thereto.

The coil substrate 11 may be, for example, a polypropylene glycol (PPG) substrate, a ferrite substrate, a metal based soft magnetic substrate, or the like.

A through hole is formed in a central portion of the coil substrate 11, and filled with the magnetic material, thereby forming a core part 25. In a case in which the core part 25 filled with the magnetic material is formed as described above, an area of the magnetic material through which a magnetic flux passes may be increased, and thus, inductance L may be further improved.

However, in various embodiments, the coil substrate 11 is not necessarily included, and the coil member may be formed using a metal wire without the coil substrate.

The body 20 may be formed around the coil member to form the exterior of the coil component and have a shape of a hexahedron having both end surfaces opposing each other in the length direction, both side surfaces opposing each other in the width direction, and upper and lower surfaces opposing each other in the thickness direction, but is not limited thereto.

The body 20 contains first and second magnetic powder particles 21a and 21b having different average particles sizes from each other. The first and second magnetic powder particles 21a and 21b may be contained in a state in which they are dispersed in a thermosetting resin. In this case, the thermosetting resin may be, for example, an epoxy resin, a polyimide resin, or the like, but is not limited thereto.

The first magnetic powder 21a may be a Fe based crystalline powder having an average particle size from about 0.5 to about 3 μm, and the second magnetic powder 21b may be a FeCrSi based amorphous powder having an average particle size from about 15 to about 30 μm, but the first and second magnetic powder particles 21a and 21b are not limited thereto.

Here, the term "average particle size" may mean a particle size of magnetic powder at a point at which the number of magnetic powder particles is the largest at the time of measuring the number of magnetic powder particles depending on the particle size to draw a normal distribution curve or a distribution curve similar to the normal distribution curve.

Meanwhile, although a case in which the body 20 contains two kinds of magnetic powder particles having different average particle sizes from each other is described by way of example in the present embodiment, a case in which the body contains three or more kinds of magnetic powder particles having different average particle sizes from each other is not excluded.

The external electrodes 31 and 32 may play a role to electrically connect the coil component to a circuit board, or the like, at the time of mounting the coil component on the circuit board, or the like, and include the first and second external electrodes 31 and 32 connected to a pair of lead portions of the coil pattern 12, respectively.

The external electrodes 31 and 32 may be formed of a metal having excellent electric conductivity. For example, the external electrodes 31 and 32 may be formed of one of silver (Ag), palladium (Pd), aluminum (Al), nickel (Ni), titanium (Ti), gold (Au), copper (Cu), platinum (Pt), and tin (Sn), an alloy thereof, or the like.

A method of forming the external electrodes 31 and 32 is not particularly limited. For example, the external electrodes 31 and 32 may be formed by a dipping method or plating method.

A shape of the external electrodes 31 and 32 is also not particularly limited. For example, the first and second external electrodes 31 and 32 may be partially or entirely formed on both end surfaces of the body in the length direction, respectively, and the first and second external electrodes 31 and 32 may be partially or entirely formed on both end surfaces of the body in the length direction and extended to at least one of the other surfaces of the body connected to both end surfaces of the body in the length direction to have an alphabet C or alphabet L shape.

The present disclosure is intended for a small coil component in which the body has a volume (length×width× thickness) of 2.4 mm³ or less (preferably, 2.2 mm³ or less), and there is a difficulty in implementing this small coil component in that generally, a self resonant frequency (SRF) of this small coil component was formed in an excessively high frequency region (about 150 MHz). Therefore, there was an attempt to move the SRF to a relative low frequency region by changing the kind of magnetic material forming the body or changing a shape of an internal electrode. However, in this case, it was difficult to commercialize this coil component due to problems in product reliability, adhesion strength at the time of mounting, and the like.

Therefore, the present disclosure is to implement SRF characteristics to be desired by adjusting the shape of the external electrodes, or the like, without changing the kind of magnetic material, a shape of an internal electrode, or the like. Hereinafter, a detailed description thereof will be provided.

The following Equation 1 relates to a SRF characteristics of a coil component.

$$SRF = 1/2\pi\sqrt{LC} \quad \text{(Equation 1)}$$

(Here, L is inductance, and C is capacitance.)

As represented in Equation 1, it may be appreciated that in order to adjust the self resonant frequency (SRF), there is a need to control parasitic capacitance.

Figure 5:
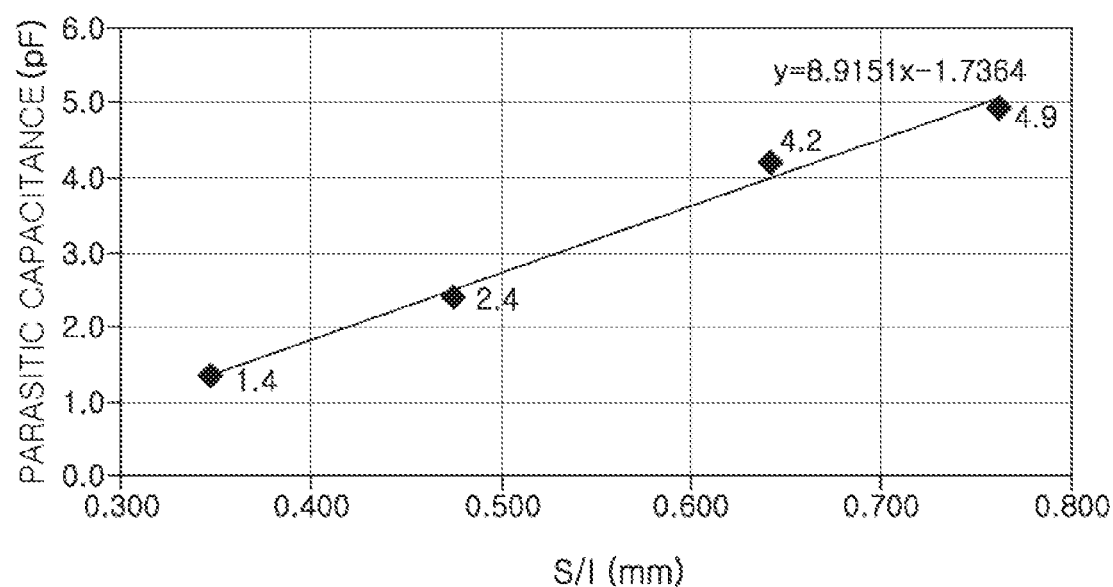
FIG. 5 is a graph illustrating a result obtained by measuring parasitic capacitance values of a plurality of coil components having inductance of 1 μH and including first and second external electrodes formed on both end surfaces thereof in a length direction, respectively, with respect to S/l.

FIG. 5 is a graph illustrating a result obtained by measuring parasitic capacitance values of a plurality of coil components having inductance of 1 µH and including first and second external electrodes formed on both end surfaces thereof in a length direction, respectively, with respect to S/l.

Here, S may mean an area (mm²) of the first and second external electrodes disposed on the first and second end surfaces of the body in the length direction. In order words, S may mean an area (mm²) of regions overlapping both end surfaces of the body in portions of the first and second external electrodes formed on both end surfaces of the body. Further, l may mean a minimum spaced distance (mm) between the first and second external electrodes formed on both end surfaces of the body. In order words, l may mean a spaced distance (mm) between both end surfaces of the body on which the first and second external electrodes are formed.

Referring to FIG. 5, a strong linearity between S/l and parasitic capacitance may be confirmed, and based on Equation 1, it may be predicted that the SRF value of the coil component depends on ~1/sqrt(S/l).

Figure 6:
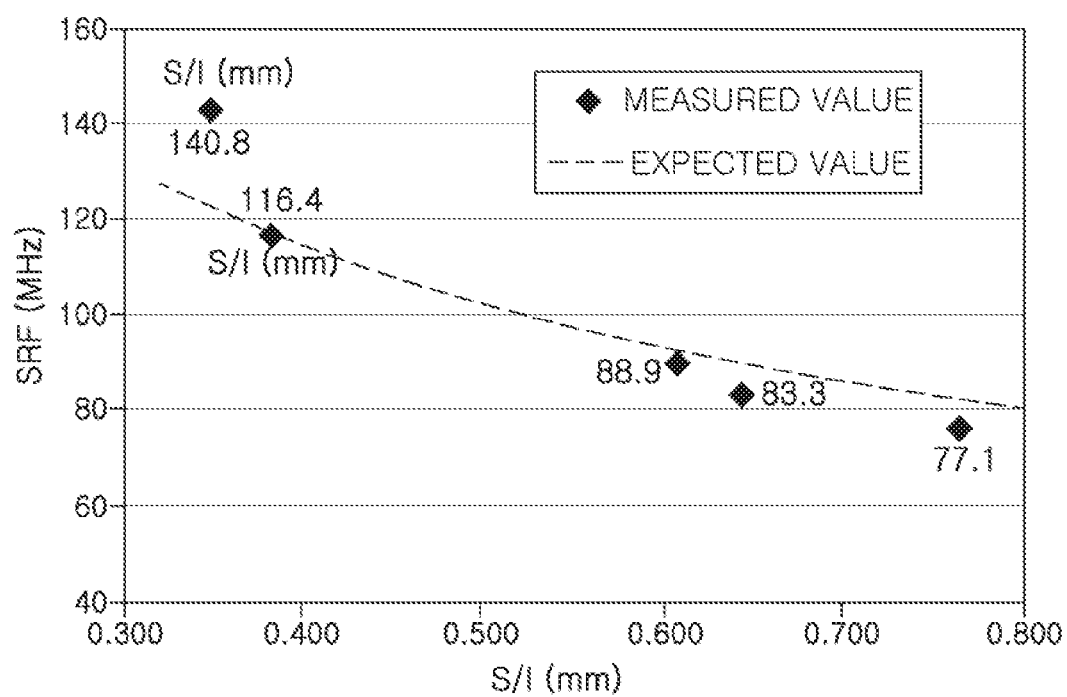
FIG. 6 is a graph illustrating a result obtained by measuring SRF values of the plurality of coil components of FIG. 5 with respect to S/l.

Therefore, SRF values of the plurality of coil components of FIG. 5 were measured, and the results are illustrated in FIG. 6. Referring to FIG. 6, it may be experimentally confirmed that the results tend to be similar to expectations.

That is, referring to results of FIGS. 5 and 6, it may be confirmed that the SRF value is significantly affected by the area of each of the regions of the first and second external electrodes formed on both end surfaces of the body and the spaced distance between both end surfaces of the body on which the first and second external electrodes are formed.

Referring to Equation 1, since the self resonant frequency (SRF) is also sensitively changed depending on the inductance Ls value, an attempt to derive an optimal range for allowing the SRF to be positioned in a relative low frequency region (about 95 to 105 MHz) by variously changing a S/l value while changing the inductance Ls value in a range of 0.68 to 2.2 µH was conducted. As a result, it may be confirmed that in a case of controlling the product of inductance Ls (pH) and S/l (mm) to be 0.45 (µH·mm) or more to 0.75 (µH·mm) or less, more preferably, 0.50 (µH·mm) or more to 0.70 (µH·mm) less, the self resonant frequency (SRF) may be positioned in a relatively low frequency region (about 95 to 105 MHz).

In a case of a power inductor disposed in an output terminal of an envelope tracker integrated circuit (ET IC), there is a need to block band noise of a receive terminal (Rx) by positioning a self resonant frequency (SRF) value (that is, a frequency at which a maximum value of impedance is positioned) to about 100 MHz. Therefore, the coil component according to the present disclosure may be preferably applied to the power inductor disposed in the output terminal of the envelope tracker integrated circuit (ET IC).

According to an embodiment, a surface insulating layer 22 may be formed on regions of outer surfaces of the body 20 except for regions of the outer surfaces of the body 20 on which the first and second external electrodes 31 and 32 are formed. In this case, there is an advantage in that at the time of performing a power management integrated circuit (PMIC) operation, AC leakage in a high frequency band (generally, a section of 1 MHz to SRF) may be decreased. Here, the surface insulating layer 22 may contain an epoxy, and have a thickness of about 5 µm or so, but is not limited thereto.

As set forth above, according to embodiments of the present disclosure, the coil component capable of having a small size, a self resonant frequency (SRF) formed in a relatively low frequency region, and high impedance in the vicinity of the SRF to perform the integrated functions of the power inductor and the bead may be provided.

While embodiments have been shown and described above, it will be apparent to those skilled in the art that modifications and variations could be made without departing from the scope of the present invention as defined by the appended claims.

What is claimed is:

1. A coil component comprising:
   a body having a volume of 2.4 mm$^3$ or less and including at least one coil member embedded therein; and
   first and second external electrodes partially or entirely formed on first and second surfaces of the body opposing each other, respectively,
   wherein a product of inductance Ls (μH) and S/1 (mm) is in a range from 0.45 μH·mm to 0.75 μH·mm, inclusive, wherein S (mm$^2$) is an area of regions of the first and second external electrodes disposed on the first and second surfaces of the body, and 1 (mm) is a minimum spaced distance between the first and second external electrodes formed on the first and second surfaces of the body.

2. The coil component of claim 1, wherein the body has a volume of 2.2 mm$^3$ or less.

3. The coil component of claim 1, wherein the product of inductance Ls (μH) and S/1 (mm) is in a range from 0.50 μH·mm to 0.70 μH inclusive.

4. The coil component of claim 1, wherein the inductance Ls is in a range from 0.68 μH; to 2.2 μH inclusive.

5. The coil component of claim 1, wherein a self-resonant frequency (SRF) is in a range from 95 MHz to 105 MHz, inclusive.

6. The coil component of claim 1, wherein the first and second external electrodes are extended to at least one of the other surfaces of the body connected to the first and second surfaces of the body.

7. The coil component of claim 1, further comprising a surface insulating layer formed on a region of outer surfaces of the body except for regions of the outer surfaces of the body on which the first and second external electrodes are formed.

8. The coil component of claim 1, wherein the body contains first and second magnetic powder particles having different average particle sizes from each other.

9. The coil component of claim 8, wherein the first magnetic powder has an average particle size from 1 μm to 3 μm, inclusive, and the second magnetic powder has an average particle size from 20 μm to 24 μm, inclusive.

10. The coil component of claim 8, wherein the first magnetic powder is a Fe based crystalline powder, and the second magnetic powder is a FeCrSi based amorphous powder.

11. The coil component of claim 1, wherein the coil member includes:
    a coil substrate; and
    first and second coil conductors formed on a first surface and a second surface of the coil substrate opposing each other, respectively.

12. The coil component of claim 11, wherein the first coil conductor has a first lead extended to be exposed to the first surface of the body, and the second coil conductor has a second lead extended to be exposed to the second surface of the body.

13. The coil component of claim 11, wherein the first and second coil conductors are connected to each other through an internal via penetrating through the coil substrate.

14. A coil component comprising:
    a body having a volume of 2.4 mm$^3$ or less and including at least one coil member embedded therein; and
    first and second external electrodes partially or entirely formed on first and second surfaces of the body opposing each other, respectively,
    wherein, in a magnetic resonance frequency range from 95 MHz to 105 MHz, a product of inductance Ls (μH) and S/1 (mm) is in a range from 0.45 μH·mm to 0.75 μH·mm, inclusive, wherein S (mm$^2$) is an area of regions of the first and second external electrodes disposed on the first and second surfaces of the body, and 1 (mm) is a minimum spaced distance between the first and second external electrodes formed on the first and second surfaces of the body.

* * * * *